United States Patent
Dobbelstein et al.

[15] 3,676,403
[45] July 11, 1972

[54] PROCESS FOR THE PRODUCTION OF INSULATING COATINGS ON ELECTRIC CONDUCTORS

[72] Inventors: Arnold Dobbelstein; Hans-Dieter Hille, both of Wuppertal-E.; Anneliese Geb. Koziolek Momm, Nierenhof, all of Germany

[73] Assignee: Dr. Krut Herberts & Co. vorm Otto Louis Herberts, Christbusch, Wuppertal-Barmen, Germany

[22] Filed: Sept. 3, 1969

[21] Appl. No.: 855,032

[30] Foreign Application Priority Data
July 23, 1969 Germany.....................P 19 37 312.7

[52] U.S. Cl..........................260/75 N, 117/128.4, 117/232, 260/33.4 P, 260/75 R

[51] Int. Cl......................................................C08g 41/00
[58] Field of Search...................................260/75 N

[56] References Cited

UNITED STATES PATENTS 3,382,203  5/1968  Rating et al............................260/33.4
3,458,480  7/1969  Schmidt et al...........................260/75

Primary Examiner—Melvin Goldstein
Attorney—Oberlin, Maky, Donnelly & Penner

[57] ABSTRACT

A process and solution for the production of insulated coatings on electric conductors, such coating solution containing a catalytic amount of a reaction product of dicyano diamide with hydrazine, the reaction product being prepared at temperatures between room temperature and about 280° C.

8 Claims, No Drawings

PROCESS FOR THE PRODUCTION OF INSULATING COATINGS ON ELECTRIC CONDUCTORS

The present invention relates to a process for the production of insulating coatings of electric conductors. The invention also relates to solutions of polyesters for carrying out this process.

It is known that electric conductors can be provided with insulating coatings by coating them with solutions of polyester resins and then heating the coated insulated conductors to elevated temperatures to form a coating from the stoved or baked polyester resin (DAS 1,033,291). It is also known that insulating coatings with improved properties can be obtained by using solutions of modified polyester resins instead of the polyester resin solutions. Polyester resins modified by 5-membered imide rings have acquired particular commercial significance in this respect (British Pat. Nos. 937,377; 1,082,181; 1,067,541, 1,067,542 and 1,127,214; Belgian Pat. No. 663,429; French Pat. No. 1,391,834; East German Patent No. 30,838; German Offenlegungsschriften 1,494,454 and 1,494,413).

The lacquer films of these wire lacquers stoved for example on to copper wire have excellent thermal stability, a high resistance to solvents, outstanding flexibility and satisfactory behavior when subjected to so-called heat-shock tests. Their pencil hardness usually amounts to between 3 and 4H and can only be increased at the expense of a considerable loss in flexibility.

However, modern methods of manufacturing electrical components (such as the winding technique employed in the production of motors and rotors) require lacquered wires of outstanding surface hardness. Pencil hardnesses in excess of 5H are desirable.

The object of the present invention is to improve the properties of insulating lacquers of the kind obtainable by conventional processes, especially their hardness.

It has now surprisingly been found that this object can be achieved very simply by adding to the lacquer solutions used for insulation catalytic quantities of reaction products of dicyano diamide with hydrazine.

Accordingly, the present invention relates to a process for the production of insulating coatings on electric conductors by coating the conductors with a solution of either polyester resins or polyester imide resins and heating the coated conductors to temperatures above 250° C which process is distinguished by the fact that the solutions contain catalytic quantities of reaction products of dicyano diamide with hydrazine prepared at temperatures between room temperature and about 280° C.

The present invention also relates to solutions of either polyester resins or polyester imide resins for carrying out the aforementioned process for the production of insulating coatings on electric conductors, the solutions in question being distinguished by the fact that they contain catalytic quantities of reaction products of dicyano diamide with hydrazine prepared at temperatures between room temperature and around 280° C.

It is possible by using the lacquer solutions according to the invention in conjunction with the process according to the invention to obtain insulating coatings which though equivalent to conventional coatings in all other properties are some 2° to 4° harder. Accordingly, the solutions according to the invention contain all the components which according to the prior art can be present in solutions of this kind that are used for the production of polyester-based insulating coatings on electrical conductors. The process for the production of insulating coatings according to the invention may be applied with particular advantage to solutions of polyester resins containing 5-membered imide groups condensed into the molecule. These individual reaction components, as disclosed in the Patent Specifications quoted earlier, will be specifically mentioned below.

The polyester resins applicable to the instant invention are those suitable for the production of insulating coatings on electric conductors. Said polyester resins may be produced, as disclosed in German DAS 1,033,291, by reacting (1) a polycarboxylic acid or esters thereof, e.g., terephthalic acid isophthalic acid or terephthalic acid dimethyl ester and (2) polyhydric alcohols, e.g., ethylene glycol, glycerine or mixtures thereof. More particularly, the polyester resins are prepared by heating in a reaction vessel from 25–56 equivalents percent of acid with 15–46 equivalents percent alcohol until a sufficient viscosity is obtained.

The polyester imide resins applicable to the instant invention may be produced as taught in either British Pat. Nos. 1,082,181; 1,067,542; 1,067,541 or 1,127,214. Said polyester imide resins are produced by reacting polybasic carboxylic acids, polyhydric alcohols and imide forming moieties.

According to British Pat. No. 1,067,541 said polyester imides comprise reacting 10 equivalents of an aromatic polycarboxylic acid with at least one pair of carboxyl groups in orthoposition to each other with from 5 to 16 equivalents of di- and/or trihydric alcohols and from 5.5 to 0.5 equivalents of di-primary amines, amino-acids and/or hydroxyamines, where for every 10 equivalents of di-functional compounds there are from 4 to 20, preferably from 6 to 15 equivalents of polyfunctional compounds at temperatures of up to 250° C, if desired in the presence of solvents and/or carriers, the reaction being continued until the product becomes clear.

There may also be used as an additional reactant an ester of zirconic or titanic acid in an amount such as to provide 0.1 to 0.2 g. of titanium or zirconium for every 100 g. of the polyester imide.

The acids referred to herein can be wholly or partially replaced by their ester or amide-forming derivatives for example their anhydrides or lower alkyl esters. The term lower alkyl means alkyl groups containing from one to four carbon atoms.

To reach a sufficient degree of condensation, the reaction is advantageously continued under vacuum, preferably until a 1:2 solution of the resin in m-cresol displays a viscosity of from 900 to 2,000 cP, preferably between 1,300 and 1,600 cP, at 25° C.

The preferred carboxylic acids are terephthalic acid, trimellitic acid and/or pyromellitic acid. The preferred alcohols are ethylene glycol, diethylene glycol, 1,2-propane-diol, 2,2-dimethyl-1,3-propane-diol, 4:4'-bis (hydroxy ethoxy) diphenyl-dimethyl methane, glycerin, trimethylolpropane, trimethylolethane and mixtures of these alcohols are suitable.

Suitable reactants for the amide or imide formation with the carboxylic acid groups are primarily the aromatic di-primary amines, such as phenylene-diamine, 4,4'-diamino-diphenyl, 4,4'-diamino-diphenyl-methane, 4,4'-diaminophenyl-dimethyl-methane, 4,4'-diamino-dicyclohexylmethane, 4,4'-diamino-diphenylethers diamino-diphenyl-sulphones as well as corresponding derivatives with hydrogenated phenyl-nuclei. Amino-acids, preferably amino-benzene-carboxylic acids, can also be used. The preferred hydroxyamines are amino propanol, mono ethanolamine and amino phenols.

To prepare the polyimide-ester co-condensates, hydroxy alkyl esters of a part of the polycarboxylic acids with the aforementioned polyalcohols are expediently used, for example bis-hydroxy-alkyl-terephthalate, tri-hydroxyalkyl-trimellitic acid ester, tetra-hydroxyalkyl-pyromellitic acid ester and their mixtures. The preparation of these esters is effected in the known manner from the acids or from their lower (i.e., one to four carbon atoms) alkyl esters, anhydrides and/or anhydro-acids with addition of esterification catalysts and in some cases carriers where sublimate has to be dealt with (the term "anhydro-acid" as used herein means an acid in which not all of the carboxyl groups have been converted into anhydride groups). The remaining part of the polycarboxylic acid is introduced in portions at temperatures of from 120° to 160° C into these pre-warmed precursors, mixed with the polyamines or with a mixture of polyamines. This addition leads to an immediate and violent release of water. The rate of addition depends on the nature of the reaction mixture formed with regard to consistency and foaming. The temperature of the reaction charge is raised again after each addition, until the initial paste becomes more thinly-flowing and the release of water subsides. Corresponding to the increase of melting temperature which is proportional to the increase of the imide-formation and to the degree of condensation, the reaction vessel temperature is successively raised to about 220° to 240° C. The mixture is then boiled until it becomes clear and free of water after the addition of the last portion of reactants and the condensation is finally completed under vacuum. The diamines, amino acids or amino-alcohols, such as monoethanolamine, can be introduced together with the alcohols. It is also possible to react the polycarboxylic acid anhydrides with the diamines to form intermediates, which can then be further condensed with the remainder of polycarboxylic acids and alcohols.

The process is expediently carried out in the following manner. Firstly, a polyesterimide is prepared from the other starting materials. This polyesterimide is then expediently diluted with solvents, preferably cresol. The preferred solvents are those which can also be used for the preparation of the commercial polyesterimide solution. The addition of a small amount of solvent, for example 10 percent calculated on the solids content, suffices for this purpose. There is then added to this solution the ester of zirconic or titanic acid, whereafter the reaction mixture is heated for a few minutes, for example 10 minutes, to an elevated temperature, preferably to about 180° C.

However, the zirconic or titanic acid ester can also be added to the other reactants at the start or during the preparation of the polyesterimide. It is particularly advantageous to add the zirconic or titanic acid ester to the second group of starting components indicated in the examples, which is then expediently added in several portions to the reaction mixture of the first group of starting components.

Especially good properties are displayed by polyesterimides prepared by reacting together 16 equivalents of terephthalic acid, which may be replaced up to 30 mol percent of total carboxylic acid by isophthalic acid or lower (i.e., one to four carbon atoms) dialkyl esters of the latter, 88 equivalents of ethylene glycol, which may be replaced up to 20 mol percent by other aliphatic or aromatic glycols, 96 equivalents of trimellitic acid anhydride, 24 equivalents of 4,4'-diamino-diphenyl-methane, 8 equivalents of p-aminobenzoic acid and butyl titanate in amounts such that every 100 g resin there are about 0.15–0.2 g titanium. The resins prepared in this manner have particularly advantageous electrical and mechanical properties.

Polyesterimide resins employed in the instant invention can also be those disclosed in British Pat. No. 1,082,181 wherein the polyimide constitutes 5 to 50 equivalents percent of the polyester-polyimide. The polyimide forming components that may be used are (a) aromatic tri- and tetra-carboxylic anhydrides such as trimellitic anhydride, pyromellitic dianhydride, benzophenone 2,3-2',3'-tetracarboxylic dianhydride, 2,3,6,7-naphthalene tetracarboxylic dianhydride and 3,3',4,4'-diphenyl tetracarboxylic dianhydride and (b) polyamines, preferably aromatic amines, including methylene dianiline, 3,3'-diaminodiphenyl, 1,4-diamino naphthalene, p-phenylene diamine,α,ω-nonamethylene diamine, 4,4'-diamino-diphenyl ether, 4,4-dimethyl heptamethylene diamine-1,7, diaminodiphenyl ketone, bis-(4-aminophenyl)-α,α'-p-xylene, m-phenylene diamine, xylene diamine, hexamethylene diamine, ethylene diamine, 4,4'-dicyclohexylmethane diamine, diaminodiphenyl sulfone. Reactants (a) and (b) are usually employed in an amount of approximately 2 moles of (a) per mole of (b) to form the imide-acid. Generally 1.92 to 2.08 moles of the anhydride are used per mole of diamine although the anhydride can be used in excess. Whereas, the polyester forming moieties include tris (2-hydroxyethyl) isocyanurate as the alcohol and terephthalic acid, isophthalic acid or benzophenone dicarboxylic acid as the acid.

A portion of the tris (2-hydroxyethyl) isocyanurate up to 80 percent to the total polyhydric alcohol can be replaced by another polyhydric alcohol such as ethylene glycol, glycerine, pentaerythritol, 1,1,1-trimethyloiethane, 1,1,1-trimethylolpropane, sorbitol, mannitol, dipentaerthritol, butanediol-1,4, trimethylene glycol, propylene glycol, pentanediol-1,5, neopentylene glycol, butene-2-diol-1,4, butyne-2-diol-1,4,2,2,4,4-tetramethyl-1,3-cyclobutanediol, hydroquinone di(beta hydroxyethyl) ether and 1,4-cyclohexane dimethanol. Preferably at least 50 percent of the total polyhydric alcohol is the THEI.

The polyester polyimide forming reaction may be carried out in the presence of the same solvent used to form the lacquer solutions. Said solvents include N-methyl pyrrolidone, dimethyl acetamide, dimethyl formamide, dimethyl sulphoxide, N-methyl caprolactam, xylene, cresylic acid, p-cresol, m-p-cresol mixture, and dimethyl sulphone. Mixtures of solvents can be used, e.g., blends of N-methyl pyrrolidone with dimethyl acetamide and/or dimethyl formamide, a mixture of N-methyl pyrrolidone, dimethyl acetamide and toluene (6:3:4), N-methyl pyrrolidone and xylene.

Sometimes a metal drier is added in an amount of 0.2 to 1.0 percent metal based on the total solids. Typical metal driers include zinc octoate, cadmium linoleate, zinc resinate, calcium octoate, cadmium naphthenate and zinc naphthenare.

The quantities of reaction products of dicyano diamide with hydrazine necessary to obtain the required technical effect, i.e., the production of coatings of greatly improved hardness, are governed by the composition of either the polyester resins or polyester imide resins present in the solutions and by the catalysts and additives otherwise present in the solutions, such as organic titanates and metal salts. As a rule, a greatly improved hardness of around 2 to 4H is obtained in cases where the aforementioned reaction products are added in quantities of from 0.1 to 5 percent by weight and preferably in quantities of from 0.1 to 1 percent by weight, based on the total lacquer solution. The quantity of reaction product of dicyano diamide and hydrazine most favorable for the particular lacquer solution may readily be determined by any competent expert through simple tests. Generally speaking, it is desirable to keep the quantities added as small as possible because large additions do not produce any further improvement in hardness, instead they may adversely affect the flexibility of the resulting coatings.

According to the invention, it is preferred to use reaction products of dicyano diamide with hydrazine obtained by reaction at temperatures of from 30° to 120° C. The ratio between dicyano diamide and hydrazine in the reaction is preferably a molar ratio of from 0.8 : 1 to 1 : 5 and better still a molar ratio of from 1 : 1 to 1 : 1.8. The reaction is with advantage carried out in an organic solvent miscible with hydrazine and/or water. In cases where the reaction is carried out in a solvent of the kind used as solvent for the polyester lacquer used to coat the conductors, there is no need to isolate the reaction product of dicyano diamide with hydrazine from the solution. Instead, the solution containing the reaction product dicyano diamide with hydrazine may be added directly, i.e., without any need for special purification or isolation, to the lacquer solutions used to coat the conductors.

The reaction products according to the invention obtained by reacting dicyano diamide with hydrazine do not have to be in the form of a chemically specific compound. As a rule mixtures of different chemical products are obtained in dependence upon the quantities in which the dicyano diamide and hydrazine are used. These mixtures may be used in accordance with the invention. The temperature also has some bearing on the type and quantity of the reaction products used. In cases where suitable quantities of dicyano diamide and hydrazine (or hydrazine dihydrohalides) are used at the reaction temperatures, it is possible for example to obtain high yields of 3,5-diamino-1,2,4-triazole (U.S. Pat. No. 2,648,671). In cases where hydrohalides are used in the preparation of this triazole, the ammonium halides formed during the reaction have to be removed from the reaction system because they interfere with the production of the insulating coatings. However, if hydrazine hydrate is used so that there are no salts formed as secondary products in the reaction product of dicyano diamide and hydrazine, the reaction solution may be added as such as already mentioned.

In addition, it was also possible to use pyroguanazole which is formed from dicyano diamide and hydrazine at elevated temperature (K.A.Hoffman and O.Ehrhardt, Berichten der Deutschen Chemischen Gesellschaft 45/12 (1912), pages 2,731–2,740.

The coatings on electric conductors produced in accordance with the invention have a hardness some 2° to 4° higher than that of corresponding conventional products. This in an increase in hardness which hitherto was considered impossible and had never been achieved with either polyester or polyester imide resin coatings. This represents an extremely significant technical effect.

The invention is illustrated by the following examples:

EXAMPLE 1

A polyester imide resin prepared by a conventional process from 14 percent of ethylene glycol,
21 percent of tris-(2-hydroxyethyl)-isocyanurate,
25 percent of dimethyl terephthalate,
25 percent of trimellitic acid anhydride and
15 percent of 4,4'-diamino diphenylmethane is used to prepare a lacquer solution of the following composition:

a. 33 percent of polyester imide resin
   50 percent of commercial cresol
   16.7 percent of solvent naphtha
   0.3 percent of polymeric butyl titanate Additions of b. 0.2 percent of 3,5-diamino-1,2,4-triazole
c. 0.5 percent of 3,5-diamino-1,2,4-triazole
d. 1 percent of 3,5-diamino-1,2,4-triazole
e. 1 percent ⎡ of a solution described further on
f. 2 percent ⎢ of a reaction product of dicyano diamide
g. 3 percent ⎣ and hydrazine according to the invention were added to this lacquer a) which corresponds to the prior art.

These lacquers were applied in 6 layers to a 0.8 mm diameter copper wire with felt and roller in known manner in a horizontal wire lacquering furnace 3 meters long at a temperature of from 410° to 450° C. The wire was lacquered at a rate of 10 meters per minute.

Testing of the lacquered wires produced the results set out in Table 1:

TABLE 1

| Lacquer | a | b | c | d | e | f | g |
|---|---|---|---|---|---|---|---|
| Pencil hardness | 3 H | 5–6 H | 7 H | 7 H | 6 H | 7 H | 7 H |
| Pencil hardness after 30 minutes' storage in ethanol at 60° C. | 3 H | 5 H | 7 H | 7 H | 6 H | 7 H | 7 H |
| Heat shock test 200° C., 30 minutes | S | S | S | S | S | S | S |
| Winding strength when wires are wound around their own diameter after pre-elongation of (percent) | 20 | 20 | 20 | 15 | 20 | 20 | 10 |

S = satisfactory.

The aforesaid solution of a reaction product of dicyano diamide and hydrazine was prepared as follows:

420 g (5 mols) of dicyano diamide,
900 g of ethylene glycol,
500 g of water and
340 g (5.5 mols) of hydrazine hydrate (80%)

were slowly heated with stirring to 100° C in a flask. The ammonia given off is introduced into excess 3N-hydrochloric acid. After some 8 hours, titration of the hydrochloric acid initially introduced shows that 93.5 percent of the quantity of ammonia theoretically expected has been removed from the reaction mixture. Water and a small hydrazine excess are then removed in a water-jet vacuum. A clear yellowish-brown colored solution which may be used as such in accordance with the invention is obtained in a yield of 1.58 kg.

We claim:

1. Lacquer solutions suitable for the production of insulating coatings on electric conductors, wherein said lacquer solutions comprise
   1. polyester-based insulating coatings selected from the group consisting of (a) polyester resins produced from polycarboxylic acids and polyhydric alcohols and (b) polyester imide resins produced from the moieties of (a) and in addition containing 5-membered imide groups condensed into the molecule,
   2. a catalytic amount of a reaction product of dicyano diamide with hydrazine, said reaction product being prepared at a temperature between room temperature and about 280° C, and
   3. a solvent suitable to produce solutions of (1) and (2).

2. Lacquer solutions as claimed in claim 1, further comprising a member selected from the group consisting of an estification catalyst and polyester additives selected from the group consisting of esters of zirconic or titanic acid, metal salts, and metal driers.

3. Solution as claimed in claim 1, wherein the reaction product is present in an amount of from 0.1 to 5 percent by weight, based on the total weight of the solution.

4. Solution as claimed in claim 1, wherein the reaction product of dicyano diamide with hydrazine is prepared at temperatures between 30° and 120° C.

5. Solution as claimed in claim 1, wherein the dicyano diamide and the hydrazine are reacted in a molar ratio of from 0.8 : 1 to 1 : 5.

6. Solution as claimed in claim 1, wherein the reaction product is 3,5-diamino-1,2,4-triazole.

7. Solution as claimed in claim 1, wherein the reaction product is pyroguanazole.

8. Solution as claimed in claim 1, wherein the reaction product of the dicyano diamide and the hydrazine is present in the form of its solution of reaction.

* * * * *